United States Patent
Kuo et al.

(10) Patent No.: US 8,174,769 B2
(45) Date of Patent: May 8, 2012

(54) BEAMSPLITTERS WITH OFFSET COMPENSATION

(75) Inventors: Huei Pei Kuo, Cupertino, CA (US);
Shih-Yuan Wang, Palo Alto, CA (US);
Michael Renne Ty Tan, Menlo Park, CA (US); Sagi Mathai, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 12/922,095

(22) PCT Filed: Apr. 4, 2008

(86) PCT No.: PCT/US2008/004395
§ 371 (c)(1),
(2), (4) Date: Sep. 10, 2010

(87) PCT Pub. No.: WO2009/123596
PCT Pub. Date: Oct. 8, 2009

(65) Prior Publication Data
US 2011/0019285 A1    Jan. 27, 2011

(51) Int. Cl.
*G02B 27/14* (2006.01)
*G02B 27/12* (2006.01)
(52) U.S. Cl. ........................ 359/637; 359/639
(58) Field of Classification Search .................. 359/637, 359/639
See application file for complete search history.

(56) References Cited

U.S. PATENT DOCUMENTS

| | | | |
|---|---|---|---|
| 4,735,505 A * | 4/1988 | deMey et al. | 356/451 |
| 5,617,387 A | 4/1997 | Morita | |
| 5,808,739 A | 9/1998 | Turner | |
| 5,986,815 A * | 11/1999 | Bryars | 359/634 |
| 7,012,659 B2 | 3/2006 | Smith | |
| 2006/0202115 A1 | 9/2006 | Lizotte | |

OTHER PUBLICATIONS

Hewlett-Packard Development Company, LP., Application No. PCT/US2008/004395, Filed Apr. 4, 2008, PCT International Search Report mailed Dec. 31, 2008.

* cited by examiner

*Primary Examiner* — James Jones

(57) ABSTRACT

Embodiments of the present invention are directed to beamsplitters that include optical elements to correct for beam offset. In one embodiment, a beamsplitter includes a first plate having two approximately parallel and opposing planar surfaces and a partially reflective layer coating one of the planar surfaces, and a compensator plate having two approximately parallel and opposing planar surfaces. The compensator plate is positioned so that an incident beam of light passing through the compensator plate acquires a first beam offset. Subsequently, the incident beam of light with the first beam offset passing through the first plate is split into a reflected beam and a transmitted beam by the partially reflective layer where the transmitted beam has a second beam offset that substantially cancels the first beam offset such that the transmitted beam is approximately parallel to and aligned with the incident beam.

16 Claims, 9 Drawing Sheets

BEAMSPLITTERS WITH OFFSET COMPENSATION

TECHNICAL FIELD

Embodiments of the present invention are directed to optical devices, and, in particular, to beamsplitters including offset compensation plates.

BACKGROUND

A beamsplitter is an optical device that separates a beam of light into two or more different beams of light. Beamsplitters have a variety of different and useful applications. For example, beamsplitters can be used in cameras and projectors and can be used in interferometry just to name a few. FIGS. 1A-1B show schematic representations of two types of commonly used beamsplitters. FIG. 1A shows a top and an isometric view of a cube beamsplitter 100. The cube beamsplitter 100 includes a first triangular prism 102 and a second triangular prism 104. The hypotenuse surfaces of the prisms 102 and 104 are made parallel and planar and are coated with a layer of partially reflective material 106, such as silver or aluminum. The hypotenuse of the prisms 102 and 104 can be cemented together with an adhesive having substantially the same refractive index as the prisms 102 and 104. The thickness of the layer 106 can be adjusted to allow desired fractions of light to be transmitted and reflected. As shown in FIG. 1, an incident beam of light 108 enters the cube beamsplitter 100 substantially perpendicular to a planar surface. The layer 106 splits the incident beam 108 into a transmitted beam 110 that emerges from the cube beamsplitter 100 in the same direction as the incident beam 108 and a reflected beam 112 that emerges from the cube beamsplitter 100 substantially perpendicular to the incident beam 108.

FIG. 1B shows a side view of a plate beamsplitter 120. The plate beamsplitter 120 includes a single plate 122 of glass with one surface of the plate 122 coated with a partially reflective layer 124 and the opposite surface can be coated with an anti-reflective layer. As shown in FIG. 1B, the plate 122 is oriented at 45° to an incident beam of light 126. The layer 124 reflects a first portion of the incident beam 126 to produce a reflected beam 128 that is substantially perpendicular to the incident beam 126. A second portion of the incident beam 126 enters the plate 126 producing a refracted beam 130 that is refracted upon emerging from the plate 122 to give a transmitted beam 132 oriented substantially parallel to the incident beam 126. Due to refraction of the beam entering the plate 120, the path of the transmitted beam 132 is shifted below the path of the incident beam 126, which is called the "beam offset." The magnitude of the beam offset is proportional to the thickness of the plate 122.

Although the beamsplitters 100 and 120 have been employed successfully in a number of different devices, they have a number of disadvantages. For example, cube beamsplitters are typically bulky and therefore difficult to insert into small optical devices, while the plate beamsplitter typically requires using a very thin glass or acrylic plate 122 to reduce the beam offset. However, a very thin plate 122 can be fragile and requires complicated fabrication processing. Accordingly, beamsplitters that are not as bulky and do not have significant beam offset are desired.

DETAILED DESCRIPTION

Figure 1A:
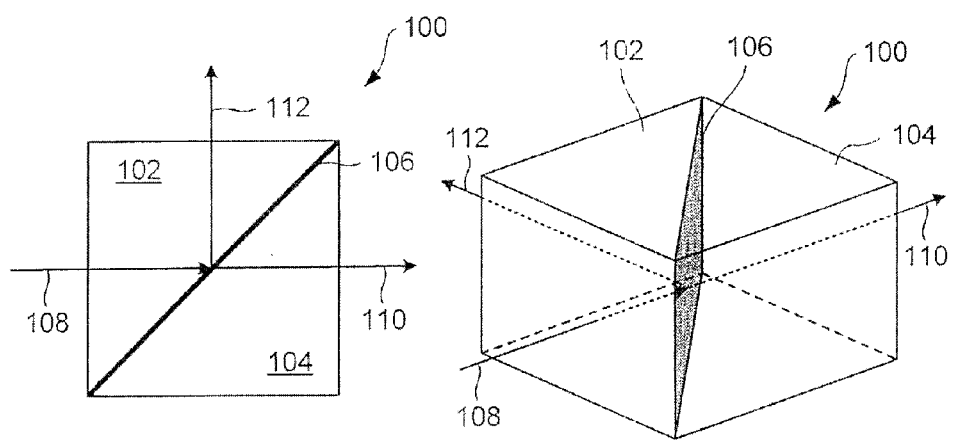
FIG. 1A shows a top and an isometric view of a cube beamsplitter.
Figure 1B:
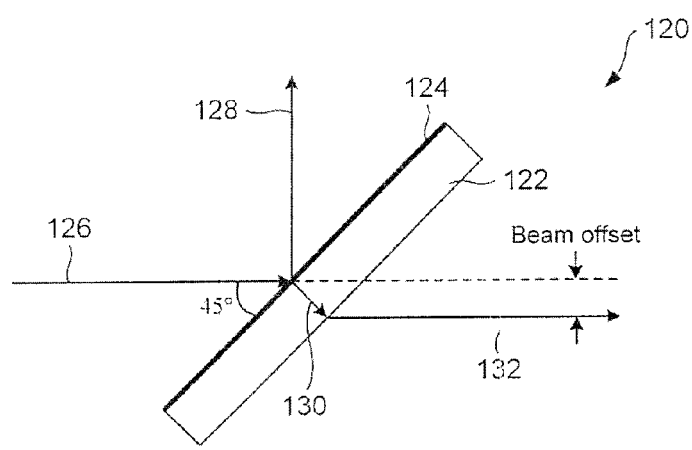
FIG. 1B shows a side view of a plate beamsplitter.
Figure 2:
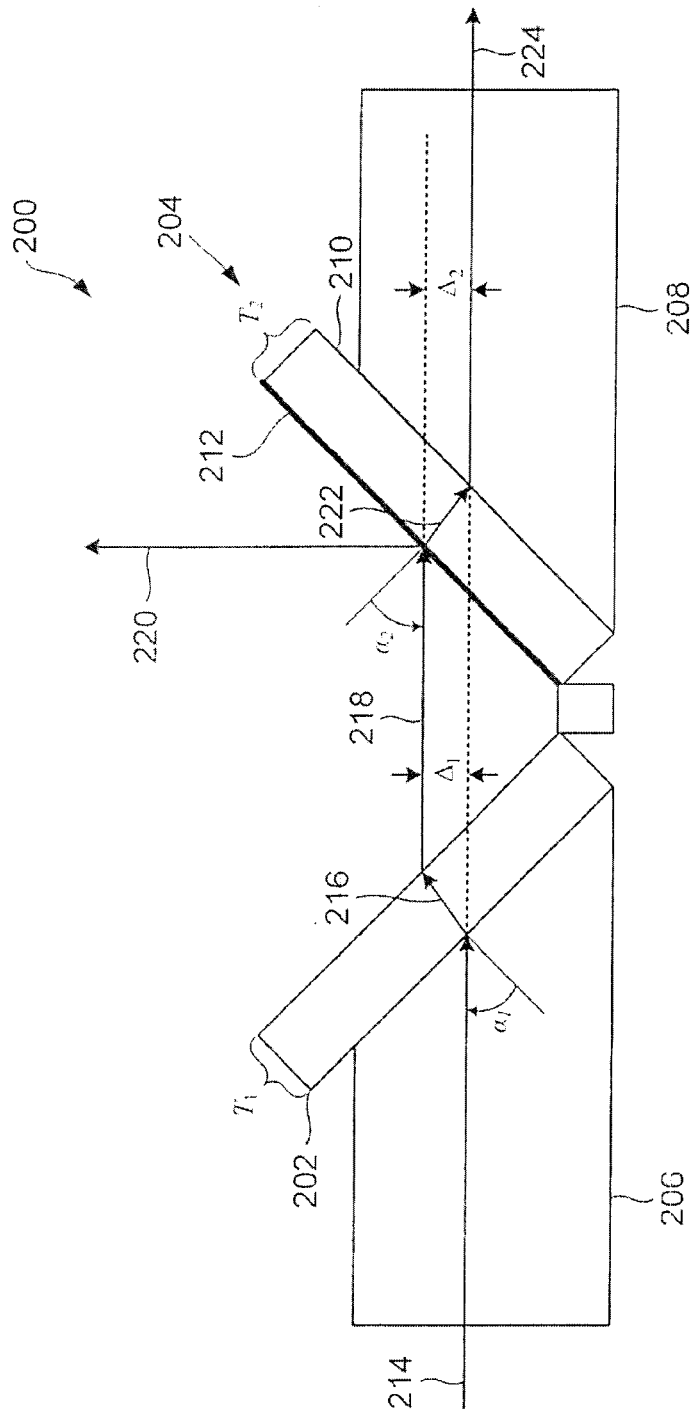
FIG. 2 shows a schematic representation of a first beamsplitter configured in accordance with embodiments of the present invention.

Embodiments of the present invention are directed to beamsplitters that include optical elements to correct for beam offset. FIG. 2 shows a schematic representation of a first beamsplitter 200 configured in accordance with embodiments of the present invention. The beamsplitter 200 includes a compensator plate 202, a plate beamsplitter 204, a first light guide 206 that partially supports the compensator plate 202, and a second light guide 208 that partially supports the plate beamsplitter 204. The light guides 206 and 208 can be hollow waveguides composed of a metal, glass, or another suitable material or the light guides can be composed of a suitable solid dielectric material. The plate beamsplitter 204 includes a plate 210 and a partially reflective layer 212 coating one surface of the plate 210. The compensator plate 202 and the plate 210 are positioned at approximately 90° to one another. The partially reflective layer 212 can be composed of silver, aluminum, or another suitable material, where the thickness of the mirrored layer 212 can be selected according the amount of light to be reflected, or the partially reflective layer 212 can be a multilayered dielectric. Although the plates 202 and 210 are shown from the side, the plates 202 and 210 can be circular, elliptical, square, rectangular, or any other suitable shape, and the plates 202 and 210 can be composed of glass, acrylic, or another suitable material.

A ray, identified by a directional arrow, is used in the accompanying drawings to represent the direction of flow of light propagation through free space or optical systems. A beam of light is introduced to the beamsplitter 200 along the light guide 206 in the direction of ray 214. The beam of light enters the compensator plate 202 and is bent into a direction identified by ray 216. The beam of light is bent again upon emerging from the compensator plate 202 into a direction identified by ray 218. The partially reflective layer 212 splits the beam of light emerging from the compensator plate 202 into a first beam of light and a second beam of light. Ray 220 represents the path of the first beam of light reflected substantially perpendicular to the ray 218, and ray 222 represents the path the second beam of light takes through the plate 210. The second beam of light emerges from the plate 210 in the direction of ray 224. As shown in FIG. 2, the compensator plate 202 introduces a first beam offset denoted by $\Delta_1$ ($n_1$, $\alpha_1$, $T_1$), where $n_1$ is the refractive index of the compensator plate, $\alpha_1$ is the angle-of-incidence, and $T_1$ is the thickness of the compensator plate 202. The plate 212 also introduces a second beam offset $\Delta_2$ ($n_2$,$\alpha_2$,$T_2$) where $n_2$ is the refractive index of the compensator plate, $\alpha_2$ is the angle-of-incidence, and $T_2$ is the thickness of the plate 210. Embodiments of the present invention are directed to configuring the beamsplitter 200 so that the first beam offset introduced by the compensator plate 202 substantially cancels the second beam offset introduced by the plate 210 (i.e., $\Delta_2 \approx -\Delta_1$).

Figure 3:
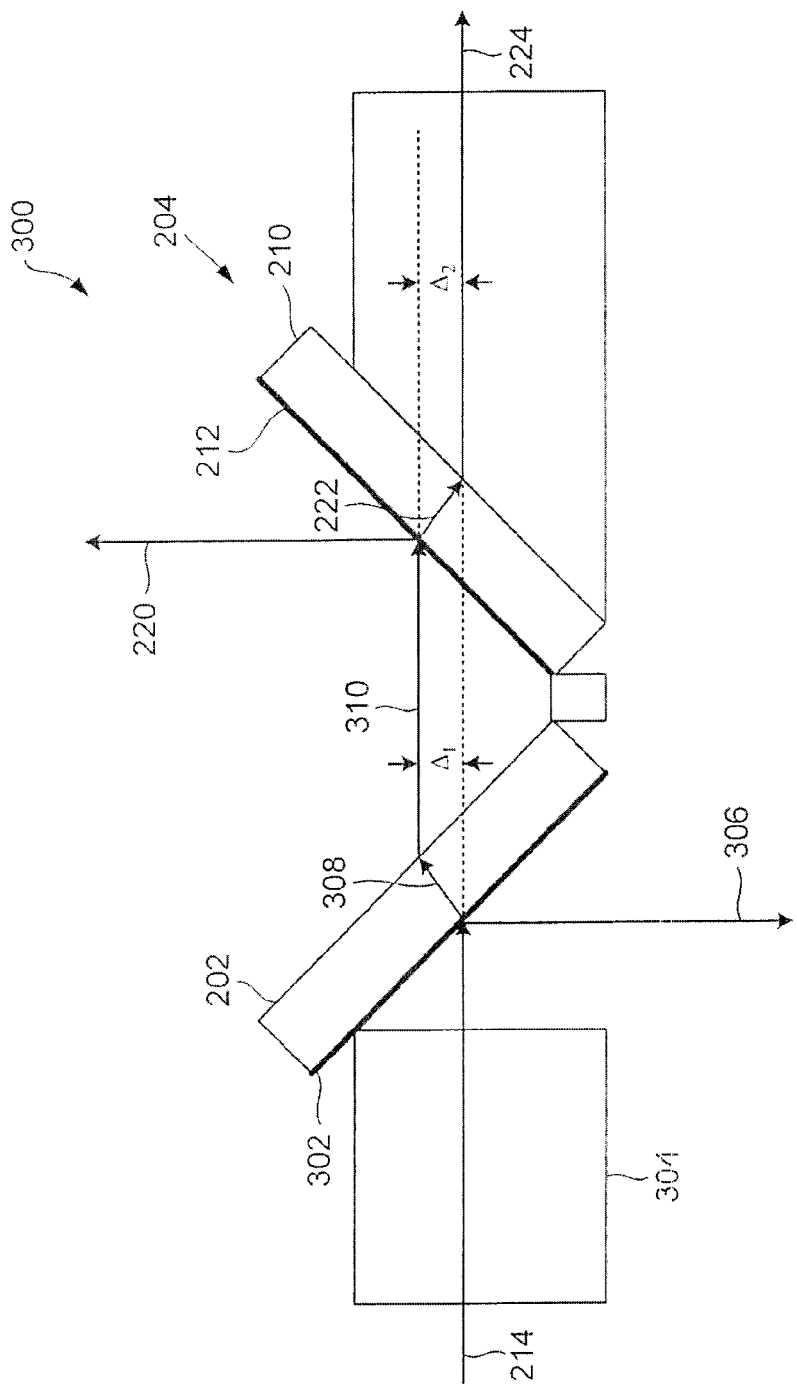
FIG. 3 shows a side view of a second beamsplitter configured in accordance with embodiments of the present invention.

FIG. 3 shows a side view of a second beamsplitter 300 configured in accordance with embodiments of the present invention. As shown in FIG. 3, the beamsplitter 300 is nearly identical to the first beamsplitter 200 except the compensator plate 202 is coated on one surface with a partially reflective layer 302. The light guide 206, shown in FIG. 2, has been replaced by a light guide 304 configured to allow a beam of light reflected off of the partially reflective layer 302 to pass without obstruction.

A beam of light is introduced to the beamsplitter 300 along the light guide 304 in the direction of ray 214 and is split by the partially reflective layer 302 into a first beam of light and a second beam of light. Ray 306 represents the direction of the first beam of light reflected off of the partially reflective layer 302 substantially perpendicular to the ray 214, and ray 308 represents the direction of the second beam of light which is bent upon entering the plate 202. The second beam of light is bent again upon emerging from the compensator plate 202 into a direction identified by ray 310. The plate beamsplitter 204 splits the second beam of light in the same manner described above with reference to FIG. 2. The compensator plate 202 introduces the same first beam offset that substantially cancels the second beam offset introduced by the plate 210.

Ideally the incident beam of light is incident on the compensator plate 202 with a 45° angle-of-incidence. When the thicknesses $T_1$ and $T_2$ of the plates 202 and 210 are substantially identical and have substantially the same refractive indices $n_1$ and $n_2$ and angles-of-incidence $\alpha_1$ and $\alpha_2$, the beams of light passing through the plates 202 and 210 ideally experience the same amount of refraction upon entering and emerging from the plates 202 and 210. As a result, the magnitude of the first beam offset $\Delta_1$, and the magnitude of the second beam offset $\Delta_2$ are expected to be nearly identical and cancel each other. The beam of light 224 emerges with substantially the same direction as the incident beam of light 214 and with substantially no beam offset.

Figure 4A:
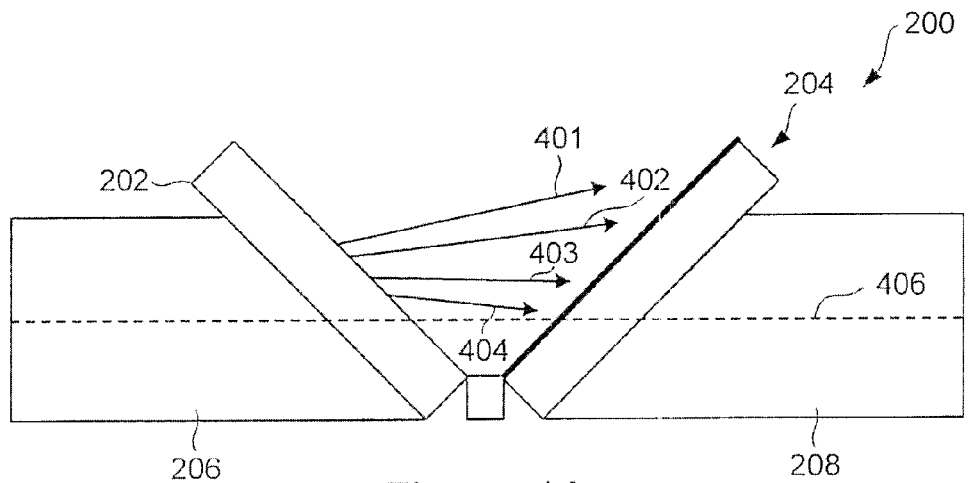
FIG. 4A shows divergent rays emerging from a compensator plate.
Figure 4B:
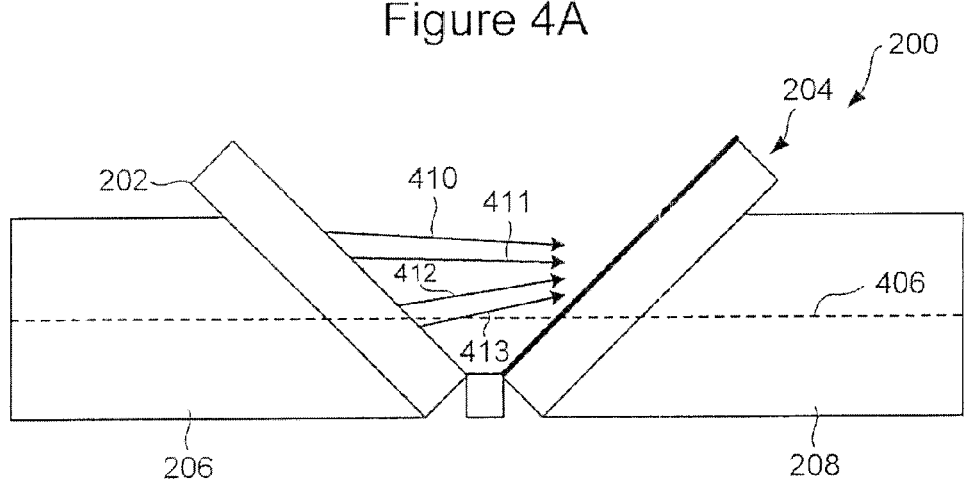
FIG. 4B shows convergent rays emerging from a compensator plate.
Figure 4C:
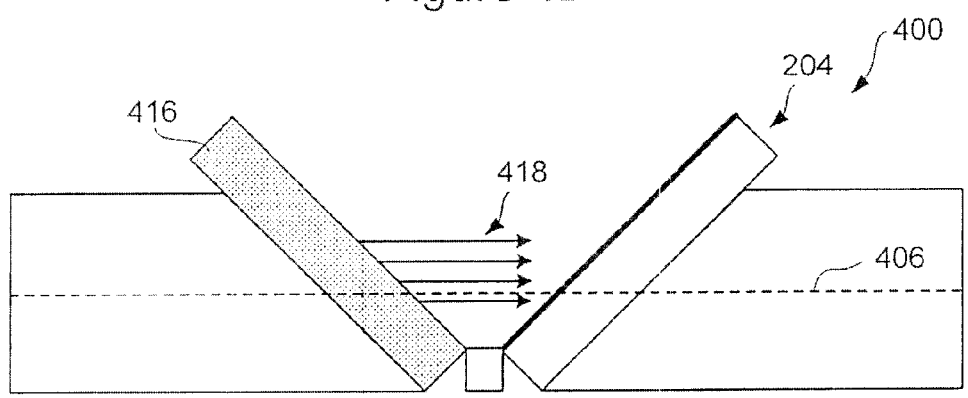
FIG. 4C shows a beamsplitter with a graded compensator plate that corrects off axis rays incident upon a beamsplitter plate in accordance with embodiments of the present invention.

In practice, however, the rays impinging on the beamsplitter plate 204 may not be paraxial, or the rays may not be parallel with, the optical axis of the beamsplitter 200. FIG. 4A shows divergent rays 401-404 emerging from the compensator plate 202. The rays 401-404 are not paraxial with the optical axis 406 of the beamsplitter 200. FIG. 4B shows convergent rays 410-413 emerging from the compensator plate 202. The rays 410-413 again are not paraxial with the optical axis 406 of the beamsplitter 200. The rays that are off axis with the optical axis 406 of the beamsplitter 200 traverse a longer distance as they pass through the beamsplitter plate 204 compared to the paraxial rays. As a result, the divergence or convergence of the rays that are not parallel with the optical axis 406 of the beamsplitter 200 is accentuated as these rays emerge from the beamsplitter plate 204. In order to compensate for the diverging rays emerging from the compensator plate 202, in certain embodiments, the compensator plate 202 can be configured with a graded refractive index that decreases with increasing distance from the center of the compensator plate. In other embodiments, the compensator plate 202 can be configured with a graded refractive index that increases with increasing distance from the center of the compensator plate 202 in order to compensate for convergent rays. In other words, the speed of light transmitted through the graded compensator plate can be represented by:

$$v(r) = \frac{c}{n_1(r)}$$

where c is the speed of light in free space, and $n_1$ (r) is the graded refractive index as a function of the radial distance r from the center of the graded compensator plate. An appropriately radially graded compensator plate orients the off axis rays into parallel rays that impinge on the beamsplitter plate 204 at an approximately 45° angle-of-incidence. This is important in order to maintain a low divergence beam for applications in hollow metal waveguides and free space optical interconnects in order to minimize optical propagation loss. FIG. 4C shows the beamsplitter 400 with a graded compensator plate 416 that corrects off axis rays incident upon the beamsplitter plate 204 in accordance with embodiments of the present invention. The radially graded compensator plate 416 adjusts the speed with which different rays pass through the graded compensator plate 416 so the parallel rays 418 emerge from the compensator plate 416 with uniform wavefronts. Parallel emerging rays 418 have a substantially uniform angle-of-incidence on the beamsplitter plate 204. The compensator plate 416 can be graded to compensate for divergent rays and graded to compensate for convergent rays. Note that the grading in the compensator plate has to be oriented so that the rays emerging from the compensator plate are substantially parallel to the optical axis.

Figure 5:
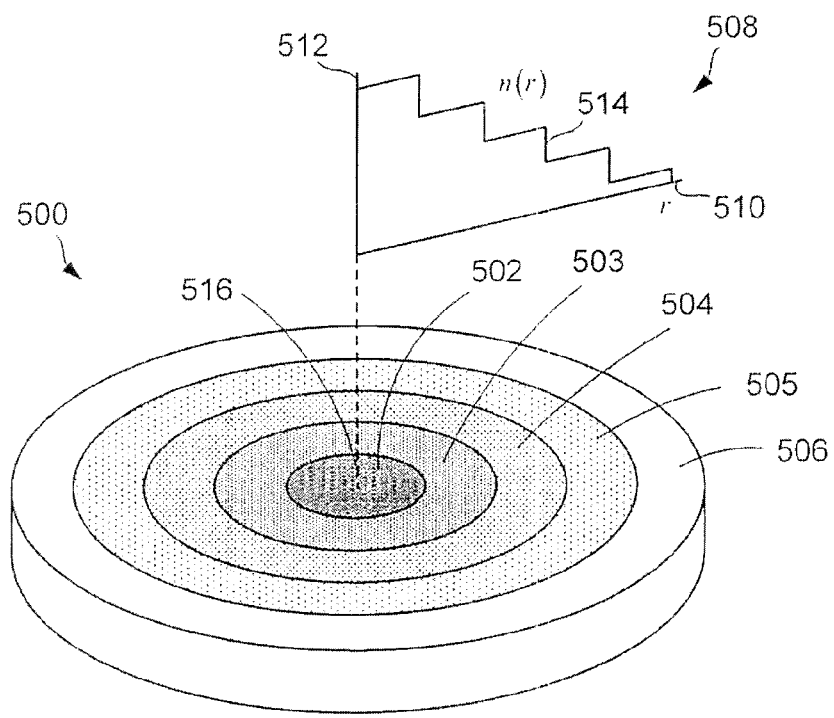
FIG. 5 shows an isometric view of a first circular-shaped graded compensator plate configured in accordance with embodiments of the present invention.

In certain embodiments of the present invention, a radially graded compensator plate can be configured in a number of different ways to compensate for divergent rays. FIGS. 5-10 correspond to a number of different ways in which compensator plates can be configured to compensate for divergent rays. FIG. 5 shows an isometric view of a first circular-shaped graded compensator plate 500 configured in accordance with embodiments of the present invention. The graded compensator plate 500 includes five discrete regions 502-506, each region having a different associated refractive index. FIG. 5 also includes a plot 508 with an axis 510 representing the radius of the compensator plate 500, an axis 512 representing the magnitude of the refractive index n(r), and a curve n(r) 514 representing the step-wise refractive index associated with each discrete region between the center 516 and the outer edge of the graded compensator plate 500. The curve 514 indicates that rays passing through the region 502 experience the most retardation while rays passing through the region 506 experience the least retardation. The regions 502-506 can be formed using well-known ion diffusion techniques. The grading in the refractive index associated with the regions 502-506 is the result of different concentrations of a particular ion. In other embodiments, the size, width, number of discrete concentric regions can vary.

Figure 6:
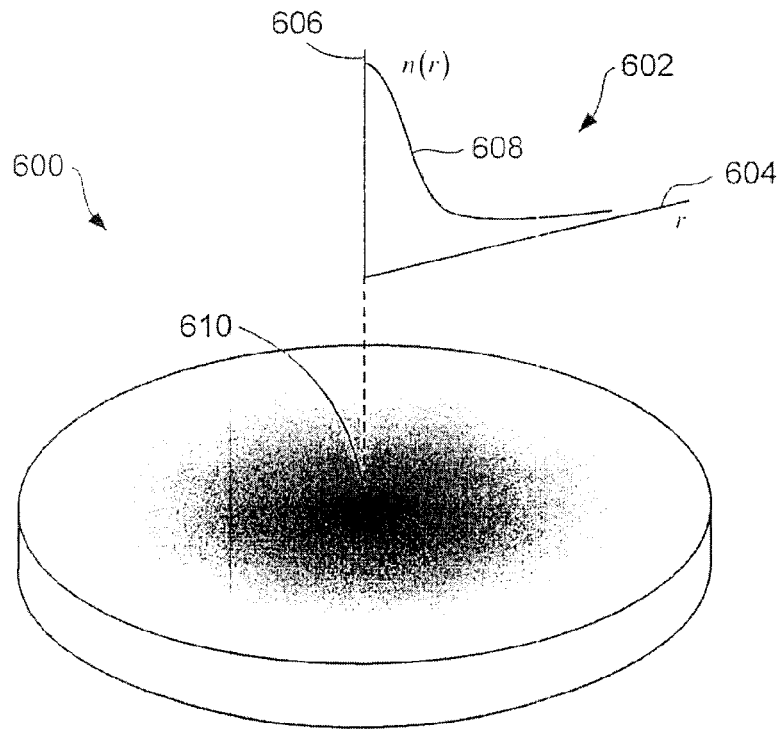
FIG. 6 shows an isometric view of a second circular-shaped graded compensator plate configured in accordance with embodiments of the present invention.

FIG. 6 shows an isometric view of a second circular-shaped radially graded compensator plate 600 configured in accordance with embodiments of the present invention. The graded compensator plate 600 includes a smooth graded refractive index represented by a smoothly varying shaded region. FIG. 6 also includes a plot 602 with an axis 604 representing the radius of the compensator plate 600, an axis 606 representing the magnitude of the refractive index n(r), and a curve n(r) 608 representing the refractive index decreases in a continuous manner from the center 610 to the outer edge of the graded compensator plate 600. The curve 608 indicates that rays passing through the graded compensator plate 600 experience the most retardation near the center 610 and gradually less retardation toward the outer edge. The smoothly varying grading in the refractive index is the result of a smoothly varying concentration of a particular ion, which can be formed using well-known ion diffusion techniques. Note that the curve 608 represents a non-linear variation in the refractive index. In other embodiments, the graded compensator plate 600 can be configured with a nearly linear variation between the center 610 and the outer edge.

Figure 7:
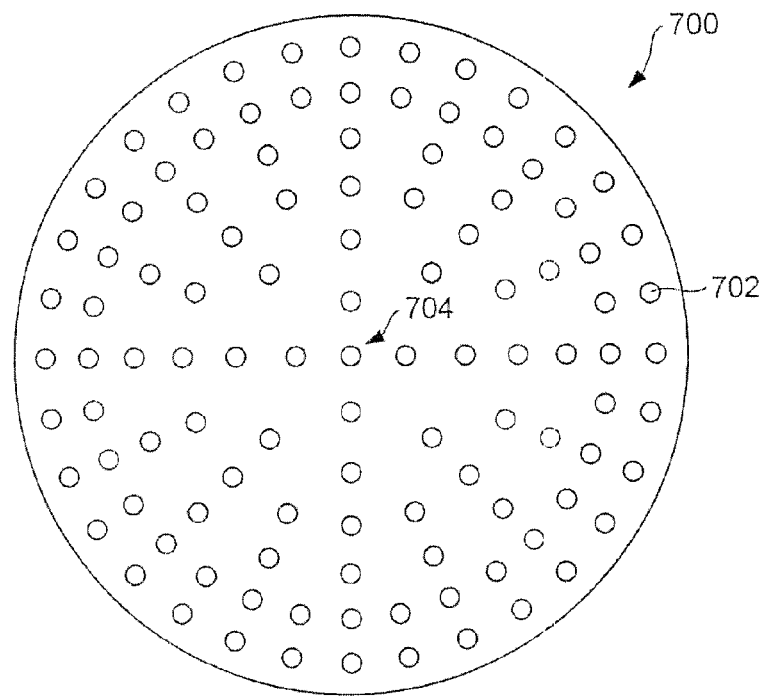
FIG. 7 shows a top view of a circular-shaped defect-based graded compensator plate configured in accordance with embodiments of the present invention.

In other embodiments, a graded compensator plate can be formed by introducing bubbles and/or holes called "defects" to the compensator plate. FIG. 7 shows a top view of a third circular-shaped, defect-based, radially graded, compensator plate 700 configured in accordance with embodiments of the present invention. The defects are represented by circles, such as circle 702. FIG. 7 reveals that the concentration of defects increases outward from the center 704, where the terms "concentration of defects" refers to the number of defects per unit area. In other embodiments, the size, shape, arrangement, and variations in the concentration of defects can vary.

Figure 8:
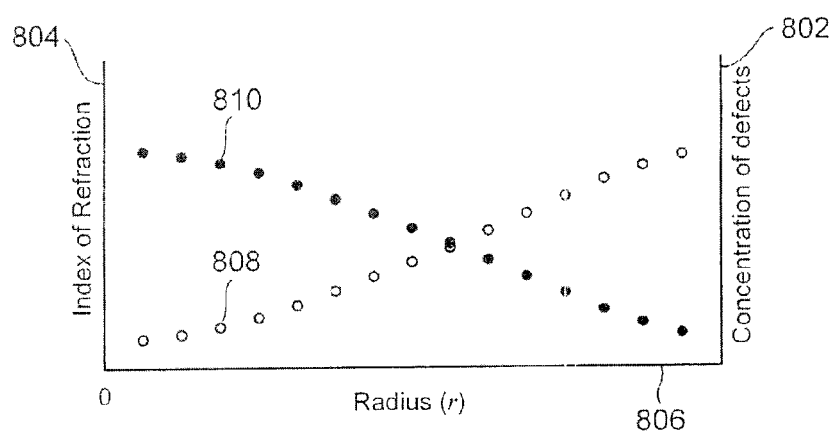
FIG. 8 shows a plot representing the general relationship between the concentration of defects and corresponding refractive index of defect-based graded compensator plates configured in accordance with embodiments of the present invention.

In general, regions of a defect-based graded compensator plate with a relatively higher concentration of defects than regions with a relatively lower concentration of defects have a relatively lower refractive index. FIG. 8 shows a plot representing the general relationship between the concentration of defects and corresponding refractive index of defect-based graded compensator plates configured in accordance with embodiments of the present invention. Axis 802 represents the concentration of defects, axis 804 represents the magnitude of the refractive index, and axis 806 represents the radius of a circular-shaped, defect-based, radially graded compensator plate. Open circles, such as open circle 808, represent the concentration of defects at fifteen regions along a hypothetical line extending outward from the center of a defect-based graded compensator plate, and closed circles, such as closed circle 810, represent the refractive index associated with each of the fifteen regions. The hypothetical data points show that regions with a relatively high concentration of defects have a relatively lower refractive index than regions with a relatively low concentration of defects.

Figure 9:
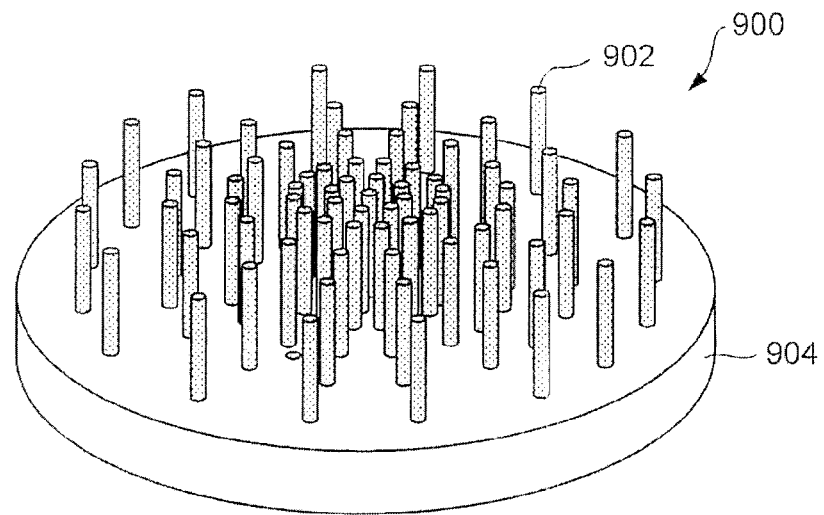
FIG. 9 shows an isometric view of a circular-shaped nanowire-based graded compensator plate configured in accordance with embodiments of the present invention.

In still other embodiments, a graded compensator plate can be formed by disposing nanowires on one surface of a substrate. FIG. 9 shows an isometric view of a fourth circular-shaped, nanowire-based, graded compensator plate 900 configured in accordance with embodiments of the present invention. The nanowires, such as nanowire 902, are disposed on one surface of a substrate 904 and the nanowires and the substrate 904 can be composed of glass, acrylic, or any other suitable transparent dielectric material. FIG. 9 reveals that the concentration of nanowires increases from the center 906 to the outer edge of the graded compensator plate, where the term "concentration of nanowires" refers to the number of nanowire per unit area. Embodiments of the present invention include variations in the length, shape, diameter, and concentration of the nanowires.

Figure 10:
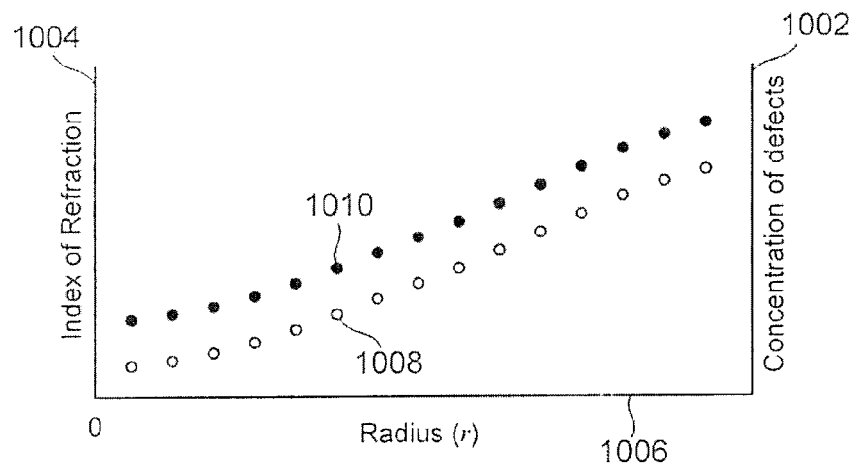
FIG. 10 shows a plot representing the general relationship between the concentration of nanowires and corresponding refractive index of nanowire-based graded compensator plates configured in accordance with embodiments of the present invention.

In general, regions of a nanowire-based graded compensator plate with a relatively higher concentration of nanowires than regions with a relatively lower concentration of nanowires have a relatively higher refractive index. FIG. 10 shows a plot representing the general relationship between the concentration of nanowires and corresponding refractive index of nanowire-based graded compensator plates configured in accordance with embodiments of the present invention. Axis 1002 represents the concentration of nanowires, axis 1004 represents the magnitude of the refractive index, and axis 1006 the radius of a circular-shaped, nanowire-based, radially graded compensator plate. Open circles, such as open circle 1008, represent the concentration of defects at fifteen regions along a hypothetical line extending outward from the center of a nanowire-based graded compensator plate, and closed circles, such as closed circle 1010, represent the refractive index associated with each of the fifteen regions. The hypothetical data points show that regions with a relatively high concentration of nanowires have a relatively higher refractive index than regions with a relatively low concentration of nanowires.

Figure 11:
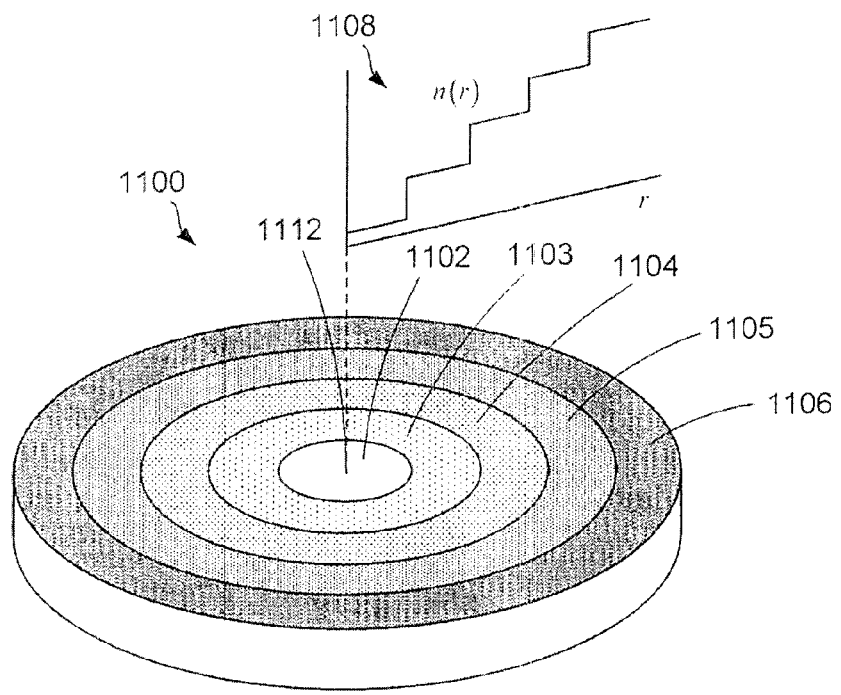
FIG. 11 shows an isometric view of a fifth circular-shaped graded compensator plate configured in accordance with embodiments of the present invention.

In other embodiments, a radially graded compensator plate can be configured in a number of different ways to compensate for convergent rays. This can be accomplished by configuring the compensator plates with radially increasing refractive indices. FIG. 11 shows an isometric view of a fifth circularly shaped graded compensator plate 1100 configured in accordance with embodiments of the present invention. The graded compensator plate 1100 includes five discrete regions 1102-1106, each region having a different associated refractive index. FIG. 11 also includes a plot 1108 of the magnitude of the refractive index n(r) 1110 associated with each of the discrete regions. The refractive index n(r) 1110 indicates that rays passing through the region 1102 experience the least retardation while rays passing through the region 1106 experience the most retardation. In other embodiments, the size, width, and number of discrete concentric regions can vary.

Figure 12:
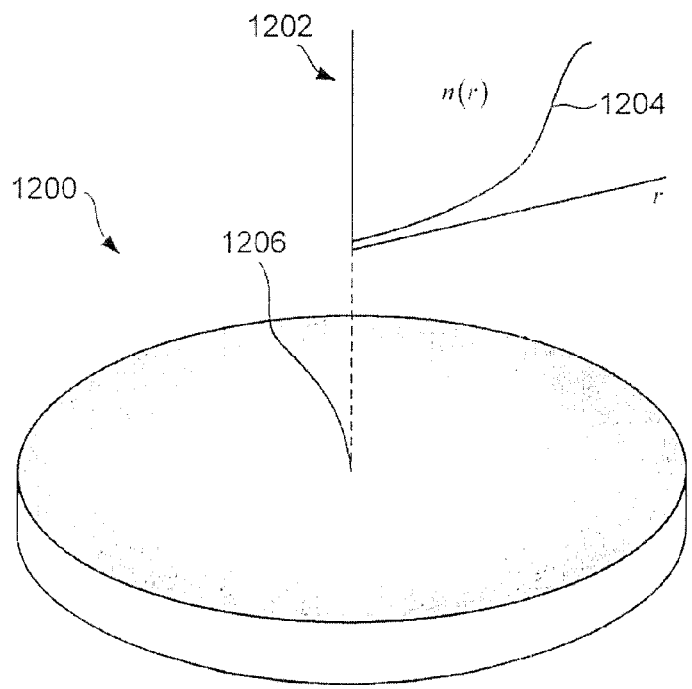
FIG. 12 shows an isometric view of a sixth circular-shaped radially graded compensator plate configured in accordance with embodiments of the present invention.

FIG. 12 shows an isometric view of a sixth circularly shaped radially graded compensator plate 1200 configured in accordance with embodiments of the present invention. The graded compensator plate 1200 includes a smooth graded refractive index represented by a smoothly varying shaded region. FIG. 12 also includes a plot 1202 of the refractive index n(r) 1204 representing how the refractive index increases in a continuous manner from the center 1206 to the outer edge of the graded compensator plate 1200. The curve 608 indicates that rays passing through the graded compensator plate 1200 experiences the least retardation near the center 1206 and gradually more retardation toward the outer edge. In other embodiments, the graded compensator plate 1200 can be configured with a nearly linear variation between the center 1206 and the outer edge.

In other embodiments, a graded compensator plate can be configured with the concentration of defects decreasing radially from the center or with the concentration of nanowires increasing radially from the center.

Figure 13:
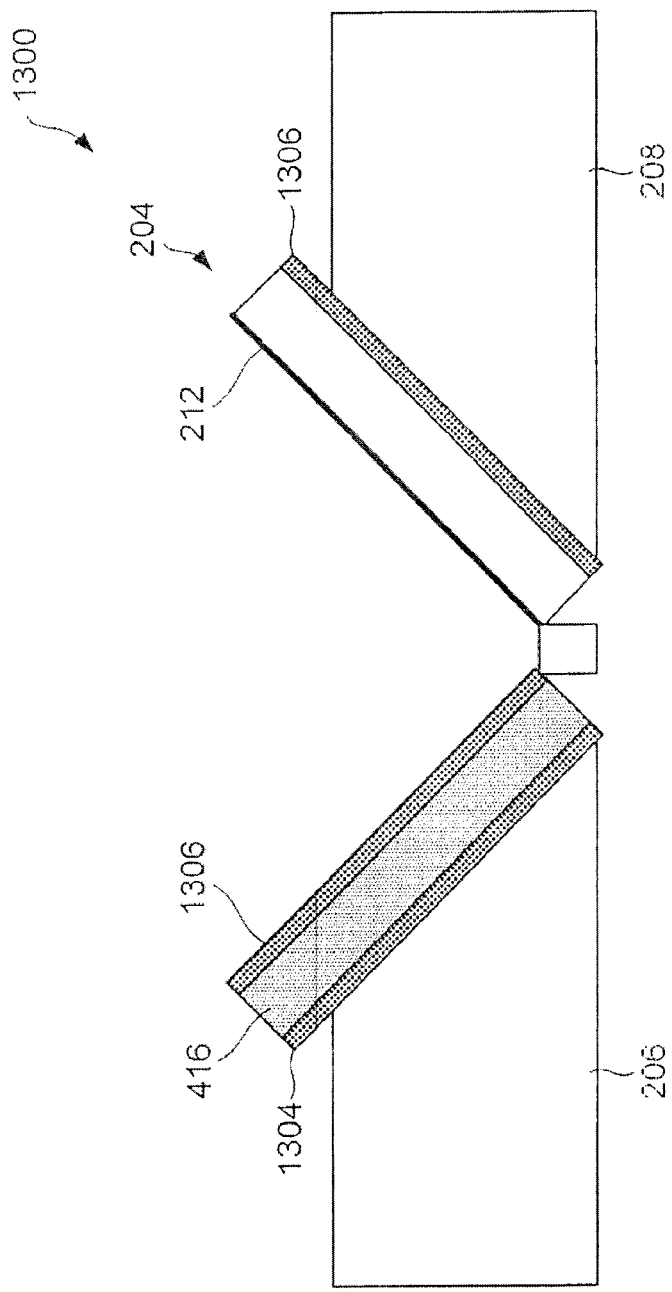
FIG. 13 shows a beamsplitter with anti-reflective coatings in accordance with embodiments of the present invention.

Beamsplitter embodiments of the present invention include configuring the compensator plate 202 and the beamsplitter plate with anti-reflective coatings to reduce the formation of ghost images. FIG. 13 shows a beamsplitter 1300 with anti-reflective coatings in accordance with embodiments of the present invention. The graded compensator plate 416 is sandwiched between a first anti-reflective coating 1302 and a second anti-reflective layer 1304, and the beamsplitter plate 204 has an anti-reflective coating 1306 disposed on the surface opposite the partially reflective layer 212. The graded compensator plate 416 can be radially graded as described above. In certain embodiments, the anti-reflective coatings 1302, 1304, and 1306 can be composed of magnesium fluoride ("$MgF_4$") or another suitable material having a relatively lower refractive index than that of the graded compensator plate 416 and the beamsplitter plate 204. The anti-reflective coatings 1302, 1304, and 1306 can also be composed of glass or acrylic and can include randomly distributed defects, such as holes or bubbles, that create a relatively lower refractive index than the radially graded compensator plate 416 and the beamsplitter plate 204.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A beamsplitter comprising:
a plate having two approximately parallel and opposing planar surfaces and a partially reflective layer coating at least one of the planar surfaces;
a first mounting system configured to support and position the plate;
a compensator plate having two approximately parallel and opposing planar surfaces; and
a second mounting system configured to support and position the compensator plate, wherein at least one of the first mounting system and the second mounting system position the plate and the compensator plate so that an incident beam of light passing through the compensator plate acquires a first beam offset, and the incident beam of light with the first beam offset passing through the plate is split into a reflected beam of light and a transmitted beam of light by the partially reflective layer where the transmitted beam of light has a second beam offset that substantially cancels the first beam offset such that the transmitted beam of light is approximately parallel to and aligned with the incident beam of light.

2. The beamsplitter of claim 1 wherein the thickness of the plate is substantially equal to the thickness of the compensator plate.

3. The beamsplitter of claim 1 wherein the thickness of the plate is different from the thickness of the compensator plate.

4. The beamsplitter of claim 1 wherein the first mounting system and the second mounting system further comprise one of:
hollow metal waveguides; and
solid dielectric material.

5. The beamsplitter of claim 1 wherein at least one of the first mounting system and the second mounting system are configured to position the plate substantially perpendicular to the compensator plate and at substantially 45° of the optical axis of the beamsplitter.

6. The beamsplitter of claim 1 wherein the plate further comprises glass or acrylic.

7. The beamsplitter of claim 1 wherein the compensator plate further comprises a graded refractive index.

8. The beamsplitter of claim 7 wherein the graded refractive index increases radially from the approximate center of the compensator plate.

9. The beamsplitter of claim 7 wherein the graded refractive index decreases radially from the approximate center of the compensator plate.

10. The beamsplitter of claim 7 wherein the graded refractive index further comprises one of:
an arrangement of defects with increasing density away from the center of the compensator plate; and
an arrangement of defects with decreasing density away from the center of the compensator plate.

11. The beamsplitter of claim 10 wherein the defects further comprise one of:
holes extending at least part way through the compensator plate; and
bubble embedded in the compensator plate.

12. The beamsplitter of claim 7 wherein the graded refractive index further comprises one of:
an arrangement of nanowires extending substantially perpendicular from one of the planar surfaces of the compensator plate, the density of the nanowires increasing toward the center of the compensator plate; and
an arrangement of nanowires extending substantially perpendicular from one of the planar surfaces of the compensator plate, the density of the nanowires increasing toward the center of the compensator plate.

13. The beamsplitter of claim 1 further comprises anti-reflective layers disposed on opposing surfaces of the compensator plate and on the surface of the plate opposite the partially reflective layer.

14. The beamsplitter of claim 13 wherein the anti-reflective layers further comprise relatively lower refractive index anti-reflective materials.

15. The beamsplitter of claim 13 wherein the anti-reflective layers further comprise glass or acrylic layers with a random distribution of bubbles or holes.

16. The beamsplitter of claim 1 further comprising a second partially reflective layer disposed on a surface of the compensator plate so that the beamsplitter can split of a second reflected beam of light.

* * * * *